(12) United States Patent
Choi

(10) Patent No.: US 10,574,037 B2
(45) Date of Patent: Feb. 25, 2020

(54) DETACHABLE SWITCH

(71) Applicant: EnDimensions Korea Co., Ltd., Seoul (KR)

(72) Inventor: Tae Seop Choi, Seoul (KR)

(73) Assignee: ENDIMENSIONS KOREA CO., LTD., Seoul (KR)

( * ) Notice: Subject to any disclaimer, the term of this patent is extended or adjusted under 35 U.S.C. 154(b) by 0 days.

(21) Appl. No.: 15/464,973

(22) Filed: Mar. 21, 2017

(65) Prior Publication Data
US 2018/0190442 A1 Jul. 5, 2018

(30) Foreign Application Priority Data

Dec. 29, 2016 (KR) .................. 10-2016-0182469

(51) Int. Cl.
*H02B 1/42* (2006.01)
*H02G 3/14* (2006.01)
(52) U.S. Cl.
CPC ............... *H02B 1/42* (2013.01); *H02G 3/14* (2013.01); *H01H 2300/03* (2013.01)
(58) Field of Classification Search
CPC ............................. H01H 9/0271; H02B 1/42
See application file for complete search history.

(56) References Cited

U.S. PATENT DOCUMENTS

| | | | | |
|---|---|---|---|---|
| 6,791,041 B1 * | 9/2004 | Chen | .................... | H01H 9/0271 200/293 |
| 8,072,766 B2 * | 12/2011 | Shimura | ............ | G07C 9/00944 174/359 |
| 8,188,707 B2 * | 5/2012 | McBurney | ............ | H02J 7/0042 320/107 |
| 8,905,610 B2 * | 12/2014 | Coleman | .............. | G02B 6/0018 362/554 |
| 9,196,432 B1 * | 11/2015 | O'Keeffe | ................ | H04W 4/21 |
| 9,326,407 B1 * | 4/2016 | Musolin | .................. | H05K 7/00 |
| 9,940,884 B1 * | 4/2018 | Musolin | .............. | G09G 3/3607 |
| 2001/0014832 A1 * | 8/2001 | Hatemata | ........... | H05B 37/0281 700/16 |
| 2004/0041504 A1 * | 3/2004 | Ozolins | ................ | G02F 1/1333 313/110 |
| 2004/0174670 A1 * | 9/2004 | Huang | .................. | G06F 1/1626 361/679.17 |
| 2005/0280598 A1 * | 12/2005 | Webb | ....................... | H01Q 1/38 343/867 |
| 2006/0012488 A1 * | 1/2006 | Hilbrink | ................ | G08C 17/00 340/12.22 |
| 2006/0025084 A1 * | 2/2006 | Kawamata | ............. | G08C 17/00 455/90.2 |
| 2006/0066151 A1 * | 3/2006 | Hatemata | ........... | H05B 37/0254 307/11 |
| 2006/0229040 A1 * | 10/2006 | Hofer | ...................... | H02J 7/025 455/196.1 |

(Continued)

FOREIGN PATENT DOCUMENTS

KR 101389566 B1 4/2014

*Primary Examiner* — David M Sinclair
*Assistant Examiner* — Theron S Milliser
(74) *Attorney, Agent, or Firm* — Dinsmore & Shohl LLP; Yongsok Choi, Esq.

(57) ABSTRACT

Provided is a detachable switch including a base plate provided in a wall surface, a switch unit to be detachably combined with the base plate, and a magnet unit enabling the base plate and the switch unit to be attached to and detached from each other.

13 Claims, 6 Drawing Sheets

(56) References Cited

U.S. PATENT DOCUMENTS

| | | | | |
|---|---|---|---|---|
| 2009/0251352 A1* | 10/2009 | Altonen | ............... | H01H 9/025 341/176 |
| 2011/0273901 A1* | 11/2011 | Nichol | ............... | G02B 6/002 362/581 |
| 2013/0088766 A1* | 4/2013 | Uken | ............... | B60K 35/00 359/267 |
| 2014/0183269 A1* | 7/2014 | Glaser | ............... | G06F 21/32 235/492 |
| 2015/0277499 A1* | 10/2015 | MacDonald | ............... | G06F 1/1654 361/679.09 |
| 2016/0148764 A1* | 5/2016 | Ruff | ............... | G08C 17/02 307/140 |
| 2017/0214188 A1* | 7/2017 | Smith | ............... | H01R 13/665 |

* cited by examiner

DETACHABLE SWITCH

CROSS-REFERENCE TO RELATED APPLICATIONS

This application claims the benefit under 35 U.S.C. § 119(a) of Korean Patent Application No. 10-2016-0182469 filed on Dec. 29, 2016, the entire disclosures of which are incorporated herein by reference for all purposes.

TECHNICAL FIELD

The present disclosure relates to a detachable switch.

BACKGROUND

Lighting switches are used to supply or control power of lighting devices in homes, offices, and the like. FIG. 1 is an exemplary diagram illustrating a conventional mechanical contact switch. Referring to FIG. 1, a mounting box 100 is embedded in a wall, and inside the mounting box 100, a cable 101 for controlling lighting is drawn out.

The mounting box 100 includes screw holes 102 at its upper and lower ends, respectively. The screw holes 102 located at the upper and lower ends of the mounting box 100 are standardized, and screw holes of the same shape and size are being used in the U.S., Korea, and Japan.

A switch main body 110 includes screw holes 111 at its upper and lower ends, respectively. The switch main body 110 is fastened to the mounting box 100 by inserting screws 130 into the screw holes 102 of the mounting box 100 and the screw holes 111 of the switch main body 110.

In order to improve appearance of the switch main body 110 fastened to the mounting box 100, a bracket 120 is further fastened to the switch main body 110. For example, the bracket 120 is fastened to the switch main body 110 by inserting screws 130 into screw holes 112 located at upper and lower ends of the switch main body 110 and screw holes 121 at upper and lower ends of the bracket 120. Otherwise, the switch main body 110 and the bracket 120 may be fastened using a hook.

FIG. 2 is a diagram illustrating a conventional display type switch. In a display type switch illustrated in FIG. 2, a switch main body 200 located inside a bracket 220 includes a display. For example, the display of the switch main body 200 is exposed to the outside through an opening part of the bracket 220. The switch main body 200 may display control buttons through a touch panel type display and receive various control signals through the displayed control buttons.

The switch main body 200 is fastened to a mounting box (not illustrated) by inserting screws (not illustrated) into the mounting box and screw holes 210 of the switch main body 200. The bracket 220 configured to expose the display is further fastened to the switch main body 200.

That is, in the conventional switch, the switch main body except the display is covered by the bracket in order not to expose the screw holes and the screws. However, according to this configuration, a switch or display area is limited to an area inside the screw holes.

Further, since the switch main body is fastened to the mounting box, it is impossible to detach the switch main body from the mounting box.

Meanwhile, Korean Patent No. 10-1389566 as a prior art related to a lighting switch discloses a lighting device which can be controlled by a jog shuttle control switch.

SUMMARY

In view of the foregoing, an exemplary embodiment of the present disclosure provides a detachable switch which can be attached and detached without changing the standards for a conventional mounting box embedded in a wall. Further, an exemplary embodiment of the present disclosure provides a detachable switch including an enlarged display area. However, problems to be solved by the present disclosure are not limited to the above-described problems. There may be other problems to be solved by the present disclosure.

According to an exemplary embodiment of the present disclosure, a detachable switch includes a base plate configured to be fixed to a wall, a switch unit to be detachably combined with the base plate, and a magnet unit including at least one magnet and configured to detachably combine the switch unit with the base plate.

According to an exemplary embodiment of the present disclosure, the switch unit may include a stationary power supply configured to supply power to the switch unit in a state of being attached to the base plate.

According to an exemplary embodiment of the present disclosure, the switch unit may further include a portable power supply configured to supply power to the switch unit in a state of being detached from the base plate.

According to an exemplary embodiment of the present disclosure, the base plate may include, in an edge area, at least one screw hole through which the base plate is fixed to a mounting box.

According to an exemplary embodiment of the present disclosure, the switch unit includes a display configured to display a graphic user interface, and the display may be overlapped with the edge area of the base plate when viewed from a front side of the detachable switch.

According to an exemplary embodiment of the present disclosure, at least two magnets of the magnet unit may be provided on each of upper and lower parts of the switch unit, and a part of the base plate may be formed of a metallic material to be magnetically coupled with the at least two magnets.

According to an exemplary embodiment of the present disclosure, at least two magnets of the magnet unit may be provided on each of upper and lower parts of the base plate, and a part of the switch unit may be formed of a metallic material to be magnetically coupled with the at least two magnets.

According to an exemplary embodiment of the present disclosure, the magnet unit may be provided on one side of the switch unit, and the switch unit may include a fastener configured to fasten the switch unit to the base plate on the other side of the switch unit.

According to an exemplary embodiment of the present disclosure, the magnet unit may be provided on one side of the base plate, and the base plate may include a fastener configured to fasten the base plate to the switch unit on the other side of the base plate.

According to an exemplary embodiment of the present disclosure, the switch unit may include a rear body to be detachably combined with the base plate and a display to be detachably combined with the rear body.

According to an exemplary embodiment of the present disclosure, the base plate may be configured to be fixed to a mounting box embedded in the wall.

According to an exemplary embodiment of the present disclosure, the base plate may be configured to be fixed to a mounting box embedded in the wall, and may include a power supply unit configured to convert alternating current power into direct current power and supply the direct current power to the stationary power supply of the switch unit.

According to an exemplary embodiment of the present disclosure, the base plate may be configured to be fixed to a switch installation area adjacent to a mounting box embedded area of the wall.

According to an exemplary embodiment of the present disclosure, the mounting box may include a power supply unit configured to convert alternating current power into direct current power and supply the direct current power to the switch unit.

According to an exemplary embodiment of the present disclosure, the detachable switch may include a cable configured to connect the power supply unit with the switch unit to supply the direct current power from the power supply unit to the switch unit.

According to an exemplary embodiment of the present disclosure, the cable may be a flexible PCB cable.

According to an exemplary embodiment of the present disclosure, a detachable switch system includes a base plate configured to be fixed to a wall, one or more magnets, and a switch unit detachably combined with the base plate based on magnetic force applied by the one or more magnets. The one or more magnets are attached to one of the base plate and the switch unit.

According to an exemplary embodiment of the present disclosure, a detachable switch system includes an electronic switch configured to be fixed to a mounting box, and a detachable switch. The detachable switch includes a base plate configured to be fixed to an area adjacent to the mounting box, one or more magnets, and a switch unit detachably combined with the base plate based on magnetic force applied by the one or more magnets.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the exemplary embodiments of the present disclosure, it is possible to provide a detachable switch which can be attached and detached without changing the standards for a conventional mounting box embedded in a wall. Further, it is possible to provide a detachable switch including an enlarged display area.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
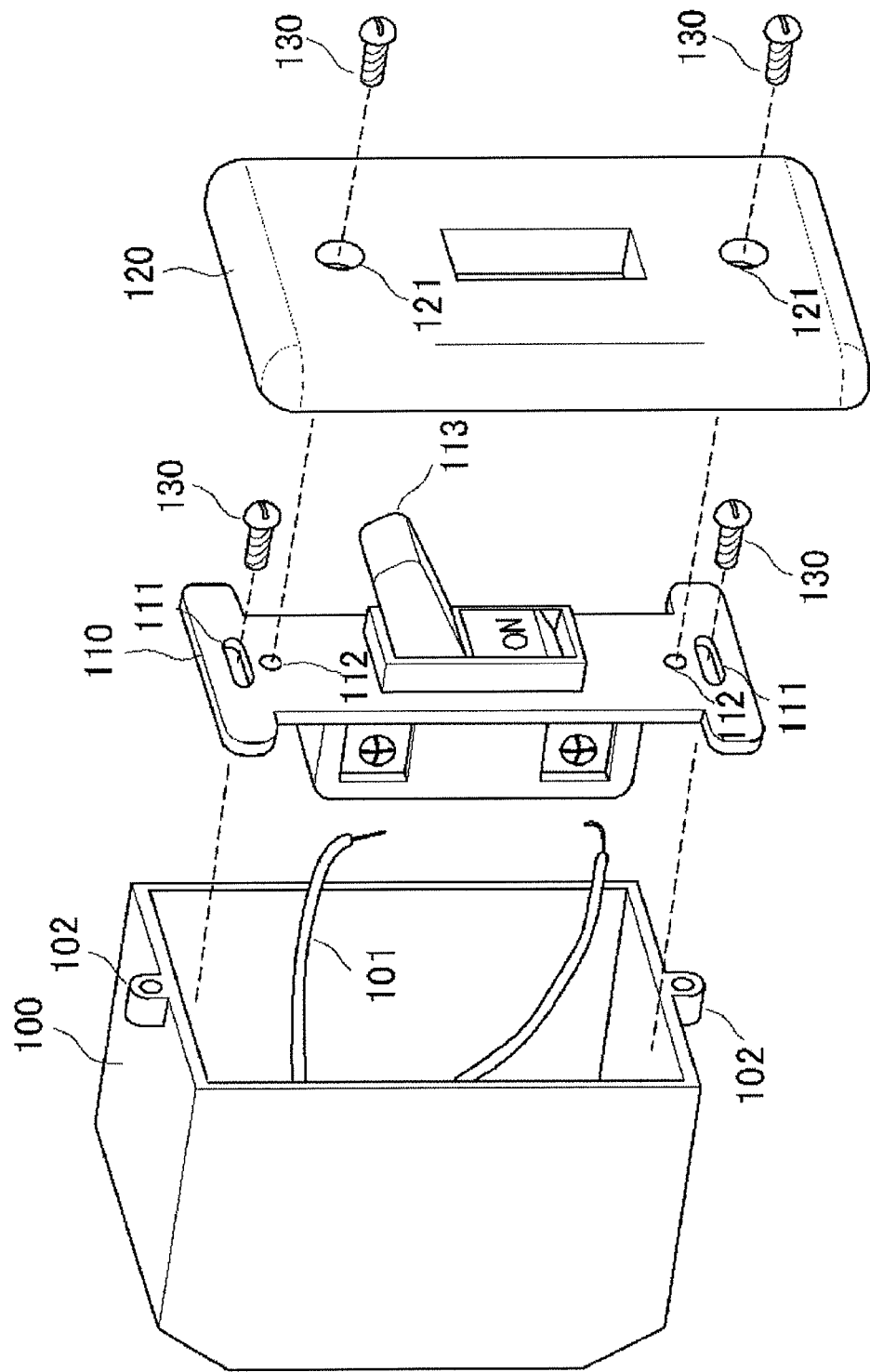
FIG. 1 is an exemplary diagram illustrating a conventional mechanical contact switch.
Figure 2:
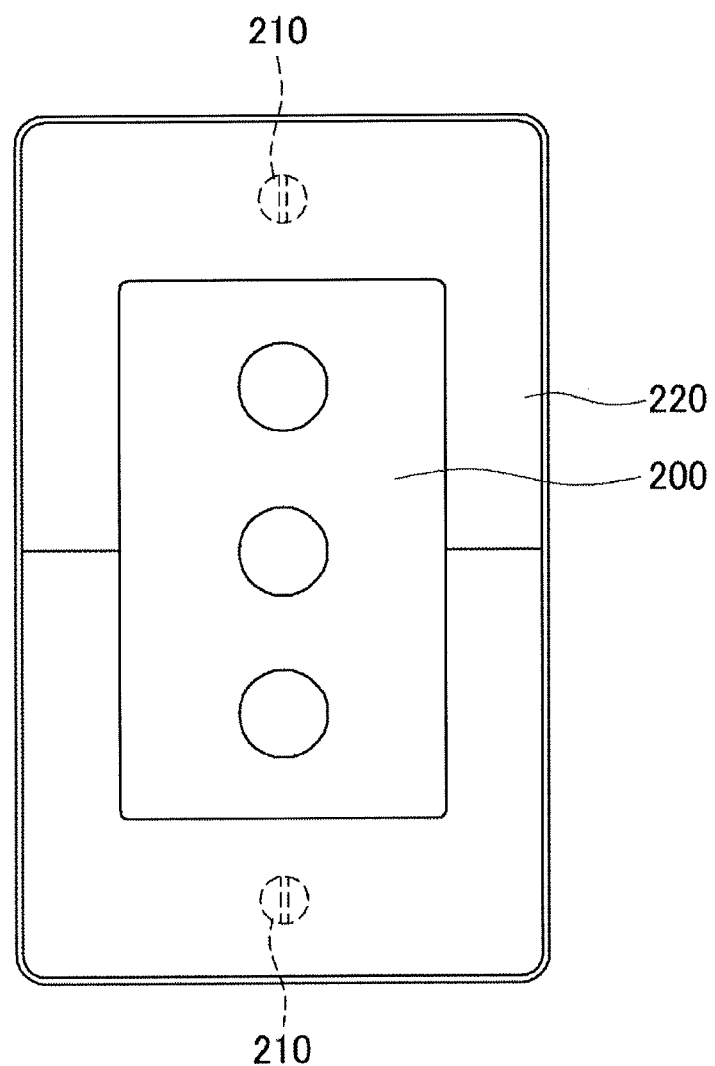
FIG. 2 is a diagram illustrating a conventional display type switch.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Hereinafter, an exemplary embodiment of the present disclosure will be described in detail with reference to the accompanying drawings.

First Exemplary Embodiment

Figure 3A:
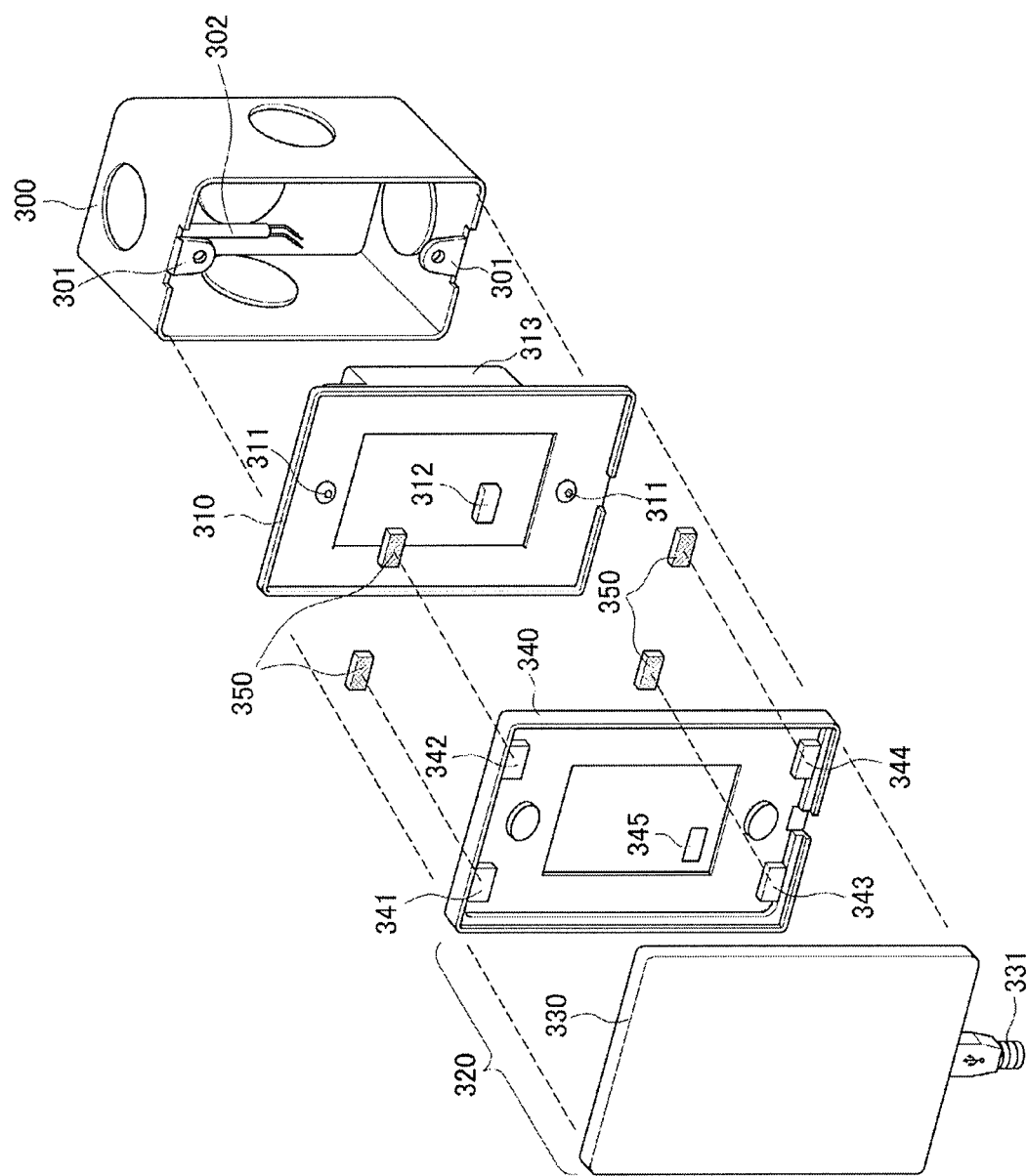
FIG. 3A and FIG. 3B are exemplary diagrams illustrating a structure of a detachable switch in accordance with an exemplary embodiment of the present disclosure.

FIG. 3A is an exemplary diagram illustrating a structure of a detachable switch in accordance with a first exemplary embodiment of the present disclosure. Referring to FIG. 3A, a detachable switch may include a base plate 310, a switch unit 320, and a magnet unit 350.

A mounting box 300 is embedded in a wall. In the mounting box 300, a cable 302 for supplying power to the switch unit 320 and receiving control signals of the switch unit 320 is drawn out. The mounting box 300 includes screw holes 301 at its upper and lower ends, respectively.

The base plate 310 may include, in an edge area, e.g., its upper and lower ends, at least one screw hole 311 through which the base plate is fixed to the mounting box 300. The base plate 310 may be fixed to the mounting box 300 embedded in the wall.

For example, the base plate 310 may be fixed to the mounting box 300 by inserting at least one screw into the screw holes 311 located at the upper and lower ends of the base plate 310 and the screw holes 301 located at the upper and lower ends of the mounting box 300.

The base plate 310 may supply power to the switch unit 320 through a connector 312. A part of the base plate 310 may be formed of a metallic material to be magnetically coupled with at least one magnet of the magnet unit 350.

The base plate 310 may include a power supply unit 313 configured to supply power to the switch unit 320. The power supply unit 313 can convert alternating current into direct current.

The power supply unit 313 may supply the converted direct current to the switch unit 320. For example, the power supply unit 313 may supply the converted direct current to the switch unit 320 through the connector 312 of the base plate 310 and a connector 345 of the switch unit 320.

For example, blade contact connectors may be used as the connectors 312 and 345 in order to solve instability in connection between contact connectors occurring in case of using a header connector and a pogo connector.

The switch unit 320 may be combined with and detached from the base plate 310. It is impossible or very difficult for a conventional switch to be attached to and detached from a mounting box. Therefore, when a user wants to change settings of the switch, a user needs to stay proximate to the switch at a fixed position and manipulate the switch, which makes the user uncomfortable.

However, the switch unit 320 of the present disclosure is designed to be attached to or detached from the base plate 310 through the magnet unit 350. Thus, the user can detach the switch unit 320 from the base plate 310, move the switch unit 320 to a position where it is easy to control the switch unit 320, and change the setting of the switch unit 320 or control the switch unit 320 at the position, as well as control the switch unit 320 and change the setting of the switch unit 320 while the switch unit 320 is attached to the base plate 310.

The switch unit 320 may further include a stationary power supply (not illustrated) configured to supply power to the switch unit 320 in a state of being attached to the base plate 310. For example, if the switch unit 320 is attached to the base plate 310, the switch unit 320 may be supplied with power from the power supply unit 313 of the base plate 310.

The switch unit 320 may further include a portable power supply 331 configured to supply power to the switch unit 320 when the switch unit 320 is detached from the base plate 310. The switch unit 320 may be connected with the portable power supply 331 through a portable power supply cable and then supplied with power. For example, the switch unit 320 may include a micro USB connector to which the portable power supply cable is connected. Otherwise, a battery built in the switch unit 320 may be charged with power using a portable charger.

The portable power supply 331 may be used to supply power to the switch unit 320 when the switch unit 320 is detached from the base plate 310 and also supply power to the switch unit 320 when a neutral line is not present in the mounting box 300 or it is difficult to connect the neutral line.

The switch unit 320 may include a display 330 and a rear body 340. The display 330 can be attached to and detached from the rear body 340. The display 330 may display a graphic user interface. Herein, the graphic user interface may be overlapped with the edge area of the base plate 310, i.e., an area where the screw holes 311 of the base plate 310 are located when viewed from a front side of the detachable switch. Therefore, unlike the prior art, the area of the display 330 is not limited due to the screw holes 311.

The magnet unit 350 may include at least one magnet and may be configured to enable the base plate 310 and the switch unit 320 to be attached to and detached from each other.

The rear body 340 may be detachably combined with the base plate 310. The switch unit 320 may further include magnet grooves 341, 342, 343, and 344 where at least one magnet of the magnet unit 350 is arranged. At least one magnet of the magnet unit 350 is arranged in the magnet grooves 341, 342, 343, and 344. A part of the base plate 310 may be formed of a metallic material to be magnetically coupled with at least one magnet of the magnet unit 350.

At least two magnets of the magnet unit 350 may be provided on each of upper and lower parts of the switch unit 320. For example, at least one magnet of the magnet unit 350 may be provide on the left and the right of the upper part of the switch unit 320 and on the left and the right of the lower part of the switch unit 320. That is, a total of four (4) magnets may be provided. Although FIG. 3A illustrates four magnets, the number of magnets is not limited thereto.

The switch unit 320 may further include a fastener (not illustrated) configured to be fastened to the base plate 310. For example, the at least one magnet of the magnet unit 350 may be arranged on one side (e.g., upper part or lower part) of the switch unit 320 and the fastener may be provided on the other side.

For example, a hook-shaped protrusion may be protruded from the other side of the switch unit 320 and the base plate 310 may include a hook at a position corresponding to the protrusion. In another embodiment, a hook may be formed on the other side of the switch unit 320 and the base plate 310 may include a hook-shaped protrusion protruded from a position corresponding to the hook.

Second Exemplary Embodiment

Figure 3B:
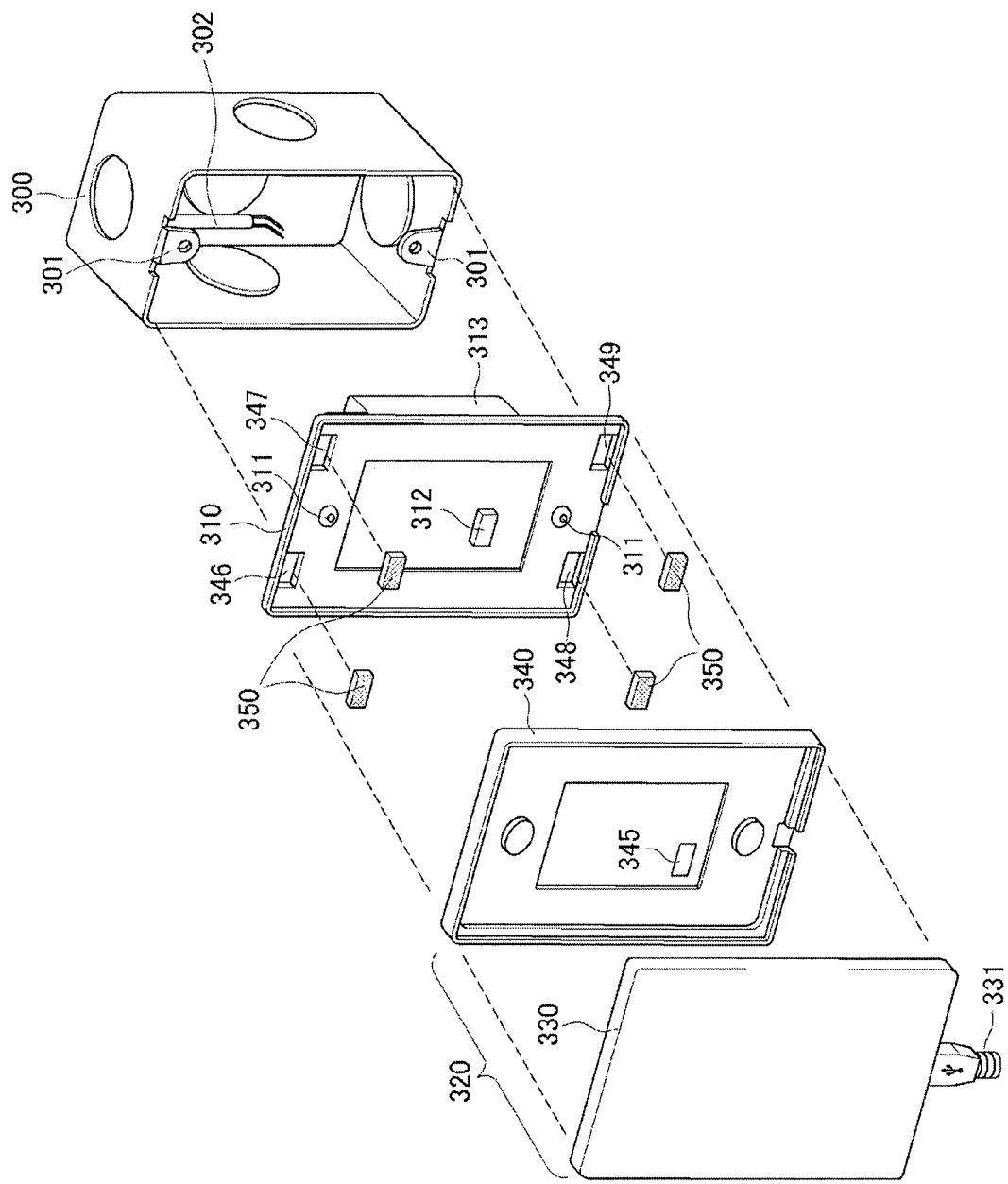

Referring to FIG. 3B, a detachable switch according to a second exemplary embodiment may include the base plate 310, the switch unit 320, and the magnet unit 350.

In the detachable switch according to the second exemplary embodiment unlike the detachable switch according to the first exemplary embodiment, the magnet unit 350 is provided on each of the upper and lower parts of the base plate 310.

Further, a part of the switch unit 320 may be formed of a metallic material to be magnetically coupled with at least one magnet of the magnet unit 350.

The rear body 340 may be detachably combined with the base plate 310. The base plate 310 may further include magnet grooves 346, 347, 348, and 349 where at least one magnet of the magnet unit 350 is arranged. At least one magnet of the magnet unit 350 is arranged in the magnet grooves 346, 347, 348, and 349.

At least two magnets of the magnet unit 350 may be provided on each of the upper and lower parts of the base plate 310. For example, at least one magnet of the magnet unit 350 may be provide on the left and the right of the upper part of the base plate 310 and on the left and the right of the lower part of the base plate 310. That is, a total of four (4) magnets may be provided. Although FIG. 3B illustrates four magnets, the number of magnets is not limited thereto.

The base plate 310 may further include a fastener (not illustrated) configured to be fastened to the switch unit 320. For example, at least one magnet of the magnet unit 350 may be arranged on one side (e.g., upper part or lower part) of the base plate 310 and the fastener may be provided on the other side. For example, a hook-shaped protrusion may be protruded from the other side of the switch unit 320 and the base plate 310 may include a hook at a position corresponding to the protrusion. In another embodiment, a hook may be formed on the other side of the switch unit 320 and the base plate 310 may include a hook-shaped protrusion protruded from a position corresponding to the hook.

Although omitted to avoid redundant description, all the above descriptions of the detachable switch according to the first exemplary embodiment can be applied to the detachable switch according to the second exemplary embodiment.

As described above, in a conventional switch, button and a display need to be located within an area where screw holes of a mounting box are located in order to follow the standards for a conventional mounting box. Therefore, the buttons and the display are limited in area.

However, in the present disclosure, the switch unit 320 and the base plate 310 are combined with each other by a magnetic force of at least one magnet of the magnet unit 350. Thus, it is possible to use the entire area of the switch unit 320 as an area for displaying the graphic user interface (i.e., display 330) irrespective of the positions of the screw holes 301 of the mounting box 300.

Third Exemplary Embodiment

Figure 4A:
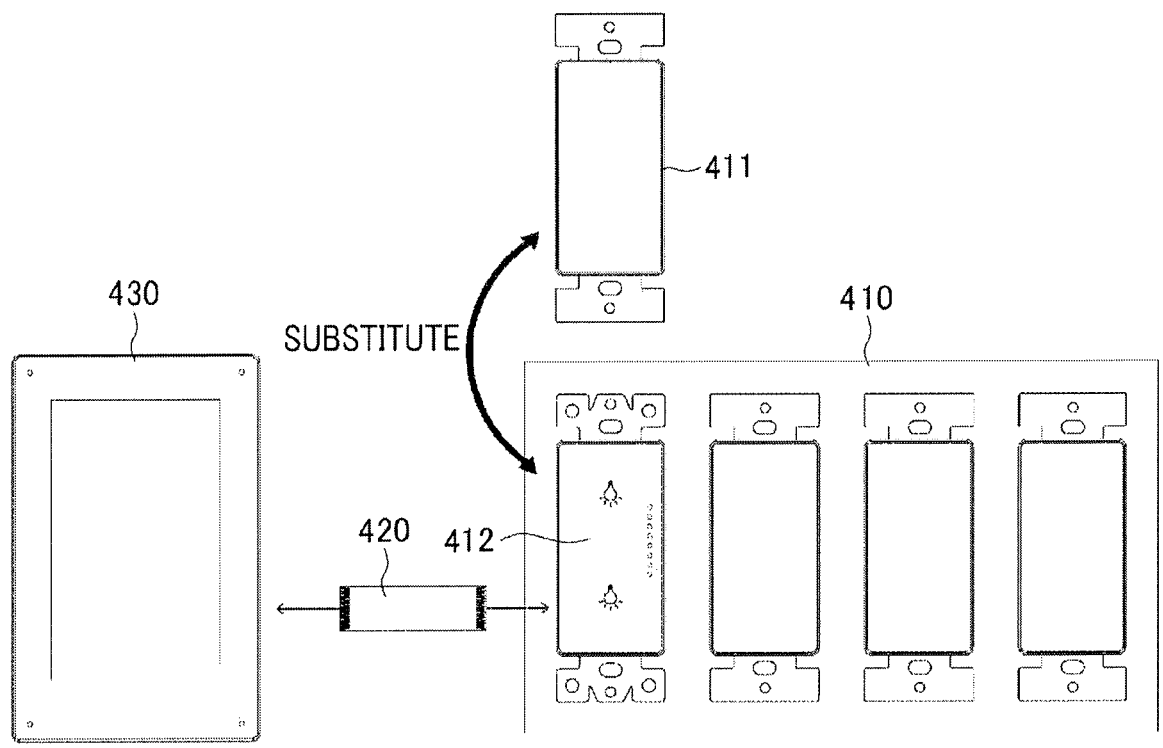
FIG. 4A and FIG. 4B are exemplary diagrams illustrating a structure of a detachable switch in accordance with another exemplary embodiment of the present disclosure.
Figure 4B:
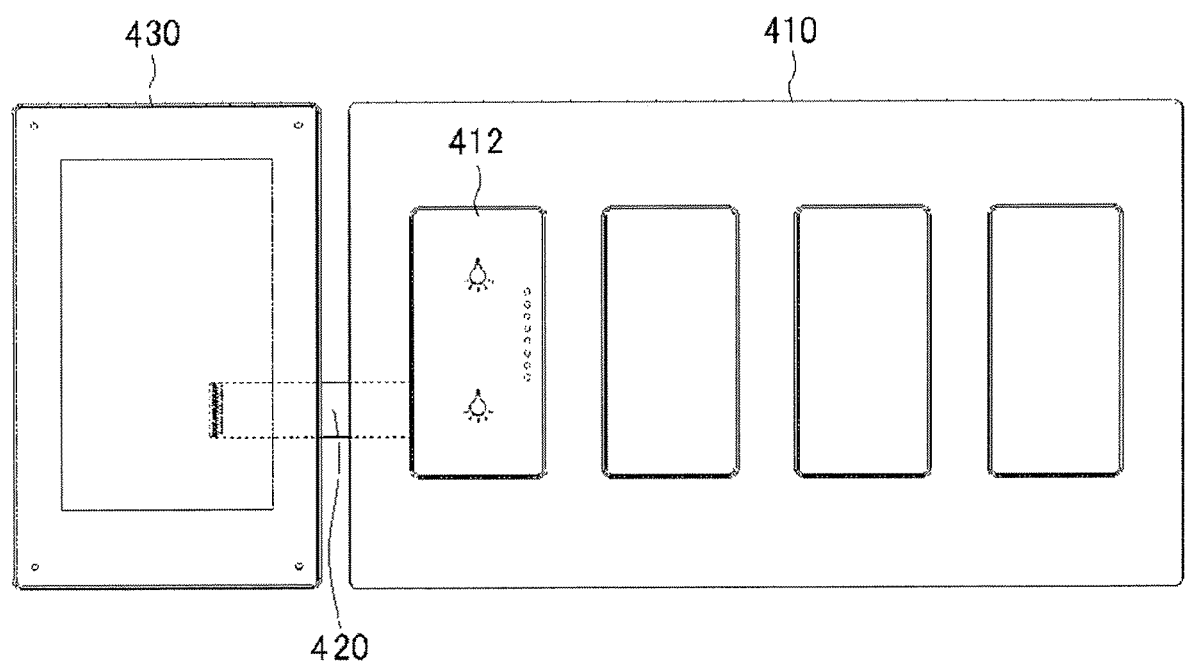

FIG. 4A and FIG. 4B are exemplary diagrams illustrating a structure of a detachable switch in accordance with another exemplary embodiment of the present disclosure. In a conventional multistructured mounting box, multiple switches are provided in a mounting box elongated in a transverse direction and the multiple switches are covered over by a single bracket.

Referring to FIG. 4A, a multistructured mounting box 410 is embedded in a mounting box embedded area of a wall. In the multistructured mounting box 410, multiple switches are provided in series.

If multiple switches are provided in the multistructured mounting box 410, each switch is adjacent to each other. Therefore, it is difficult for a detachable switch to be fixed to the multistructured mounting box 410 as shown in FIG. 3A or FIG. 3B.

Accordingly, in the third exemplary embodiment of the present disclosure, any one of the multiple switches provided in the multistructured mounting box 410 is substituted with an electronic switch 412, and a detachable switch is provided in a switch installation area adjacent to the mounting box embedded area.

The detachable switch may include a base plate (not illustrated), a flexible PCB cable 420, and a switch unit 430.

The base plate is provided in the switch installation area adjacent to the substituted electronic switch 412. The base plate may be fixed to a wall, e.g., fixed to the switch installation area by inserting screws into screw holes or through various bonding methods. Herein, the base plate of the third exemplary embodiment may be identical or similar to the base plate 310 of the first and second exemplary embodiments except that the power supply unit 313 is not provided in the base plate of the third exemplary embodiment.

The switch unit 430 is detachably combined with the base plate. The switch unit 430 of the third exemplary embodiment may be identical to the switch unit 320 of the first and second exemplary embodiments. For example, the switch unit 430 may include at least one magnet (not illustrated) and may be detachably combined with the base plate by a magnetic force of the at least one magnet.

The switch unit 430 may be supplied with power from the electronic switch 412 and may transmit control signals to the electronic switch 412 through the flexible PCB cable 420.

The electronic switch 412 may include a power supply unit (not illustrated). The power supply unit corresponds to the power supply unit 313 of the first and second exemplary embodiments and may convert alternating current into direct current. The power supply unit may supply the converted direct current to the switch unit 430 through the flexible PCB cable 420. In another embodiment, a power supply unit configured to convert alternating current into direct current may be provided at a position corresponding to the electronic switch 412 in the multistructured mounting box 410.

Referring to FIG. 4B, a detachable switch may not greatly deteriorate appearance of a wall surface since a color of the flexible PCB cable 420 is selected to be similar to that of the wall surface and the switch unit 430 is provided adjacent to the multistructured mounting box 410.

Further, in the third exemplary embodiment, the flexible PCB cable 420 is used as a cable for supplying power to the switch unit 430 and transmitting control signals to the electronic switch 412. Thus, even in a state where the flexible PCB cable 420 is connected with the switch unit 430 and the electronic switch 412, a bracket of the multistructured mounting box 410 and the switch unit 430 can be easily fastened.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A detachable switch comprising:
a base plate configured to be fixed to a wall;
a switch unit to be detachably combined with the base plate; and
a magnet unit including at least one magnet and configured to detachably combine the switch unit with the base plate, and
wherein the base plate includes, in an upper end or an lower end on a front surface of the base plate, at least two screw holes through which the base plate is fixed to a mounting box,
the switch unit includes an electronic display without a bezel on which a graphic user interface is displayed,
the upper end or the lower end is covered with the electronic display such that the at least two screw holes are positioned within a boundary of the electronic display when viewed from a front side of the detachable switch, and
a size of the electronic display is substantially same as a size of the front surface of the base plate.

2. The detachable switch of claim 1,
wherein the switch unit includes a stationary power supply configured to supply power to the switch unit in a state of being attached to the base plate.

3. The detachable switch of claim 2,
wherein the switch unit further includes a portable power supply configured to supply power to the switch unit in a state of being detached from the base plate.

4. The detachable switch of claim 1,
wherein at least two magnets of the magnet unit is provided on each of upper and lower parts of the switch unit, and
a part of the base plate is formed of a metallic material to be magnetically coupled with the at least two magnets.

5. The detachable switch of claim 1,
wherein at least two magnets of the magnet unit is provided on each of upper and lower parts of the base plate, and
a part of the switch unit is formed of a metallic material to be magnetically coupled with the at least two magnets.

6. The detachable switch of claim 1,
wherein the switch unit includes a rear body to be detachably combined with the base plate and the electronic display to be detachably combined with the rear body.

7. The detachable switch of claim 2,
wherein the base plate is configured to be fixed to a mounting box embedded in the wall, and
the base plate includes a power supply unit configured to convert alternating current power into direct current power and supply the direct current power to the stationary power supply of the switch unit.

8. The detachable switch of claim 1,
wherein the base plate is configured to be fixed to a switch installation area adjacent to a mounting box embedded area of the wall.

9. The detachable switch of claim 8,
wherein the mounting box includes a power supply unit configured to convert alternating current power into direct current power and supply the direct current power to the switch unit.

10. The detachable switch of claim 9, further comprising:
a cable configured to connect the power supply unit with the switch unit to supply the direct current power from the power supply unit to the switch unit.

11. The detachable switch of claim 10,
wherein the cable is a flexible PCB cable.

12. The detachable switch of claim 1,
wherein the switch unit includes a first connector,
the base plate includes a second connector and a power supply unit configured to supply power to the switch unit through the first and second connectors in a state that the switch unit is attached to the base plate, and
the switch unit further includes an external connector through which power is supplied to the switch unit in a state that the switch unit is detached from the base plate.

13. The detachable switch of claim 1, wherein the base plate includes, in the upper end on the front surface of the base plate, a first screw hole through which the base plate is fixed to the mounting box,
the base plate includes, in the lower end on the front surface of the base plate, a second screw hole through which the base plate is fixed to the mounting box,
the upper end and the lower end are covered with the electronic display such that the first screw hole and the second screw hole are overlapped with the electronic display when viewed from the front side of the detachable switch.

* * * * *